(12) United States Patent
Wasynczuk et al.

(10) Patent No.: US 7,490,029 B2
(45) Date of Patent: Feb. 10, 2009

(54) DISTRIBUTED SIMULATION

(75) Inventors: Oleg Wasynczuk, West Lafayette, IN (US); Charles E. Lucas, Lafayette, IN (US); Eric A. Walters, Brownsburg, IN (US); Juri V. Jatskevich, Lafayette, IN (US)

(73) Assignee: P.C. Krause & Associates, Inc., West Lafayette, IN (US)

( * ) Notice: Subject to any disclaimer, the term of this patent is extended or adjusted under 35 U.S.C. 154(b) by 941 days.

(21) Appl. No.: 09/884,528

(22) Filed: Jun. 19, 2001

(65) Prior Publication Data

US 2002/0052725 A1 May 2, 2002

Related U.S. Application Data

(60) Provisional application No. 60/212,695, filed on Jun. 19, 2000.

(51) Int. Cl.
*G06G 7/62* (2006.01)
(52) U.S. Cl. .......................................... 703/17
(58) Field of Classification Search ................ 703/17, 703/2, 19
See application file for complete search history.

(56) References Cited

U.S. PATENT DOCUMENTS

| | | | | |
|---|---|---|---|---|
| 4,456,994 A | | 6/1984 | Segarra ..................... 714/33 |
| 4,506,324 A | | 3/1985 | Healy ........................ 703/21 |
| 5,251,159 A | | 10/1993 | Rowson ..................... 703/14 |
| 5,519,848 A | | 5/1996 | Wloka et al. ................ 703/13 |
| 5,623,413 A | * | 4/1997 | Matheson et al. ........... 701/117 |
| 5,640,504 A | | 6/1997 | Johnson, Jr. ................. 714/4 |
| 5,680,551 A | | 10/1997 | Martino, II ................. 709/226 |
| 5,701,439 A | | 12/1997 | James et al. ................ 395/500 |
| 5,715,184 A | | 2/1998 | Tyler et al. .................. 703/15 |
| 5,768,160 A | | 6/1998 | Kakegawa .................. 703/16 |
| 5,774,693 A | | 6/1998 | Hsu et al. ................... 703/22 |
| 5,784,612 A | | 7/1998 | Crane et al. ................ 713/100 |
| 5,793,968 A | | 8/1998 | Gregerson et al. .......... 709/209 |
| 5,794,005 A | | 8/1998 | Steinman .................... 703/17 |
| 5,801,938 A | | 9/1998 | Kalantery .................... 700/2 |
| 5,826,060 A | | 10/1998 | Santoline et al. ............. 703/6 |
| 5,845,116 A | | 12/1998 | Saito et al. ................. 718/103 |

(Continued)

OTHER PUBLICATIONS

Fujimoto, R. "Parallel and Distributed Simulation". Proc. 31st Winter Simulation Conference. Dec. 1999. vol. 1, pp. 122-131.*

(Continued)

*Primary Examiner*—Paul L Rodriguez
*Assistant Examiner*—Russ Guill
(74) *Attorney, Agent, or Firm*—Woodward, Emhardt, Moriarty, McNett & Henry LLP

(57) ABSTRACT

A method and apparatus are presented to facilitate simulation of complex systems on multiple computing devices. Model authors can specify state-related information to be exported for viewing or access by other applications and models. Subsystem models may be written to enable connection with other subsystem models via controlled interfaces, such as by defining state-related information for export and providing for a particular use of data imported from other models to which a subsystem model is connected. In some embodiments, a consistent distributed simulation API enables cross-platform, multi-device simulation of complex systems, wherein the proprietor of each subsystem simulation can keep its implementation secret but accessible to others.

11 Claims, 10 Drawing Sheets

U.S. PATENT DOCUMENTS

| | | | | |
|---|---|---|---|---|
| 5,850,345 | A | 12/1998 | Son | 703/17 |
| 5,862,366 | A | 1/1999 | Schmidt et al. | 703/21 |
| 5,881,267 | A | 3/1999 | Dearth et al. | 703/27 |
| 5,909,542 | A | 6/1999 | Paquette et al. | 709/203 |
| 5,910,903 | A | 6/1999 | Feinberg et al. | 703/6 |
| 5,983,265 | A | 11/1999 | Martino, II | 709/206 |
| 5,999,734 | A | 12/1999 | Willis et al. | 717/149 |
| 6,031,987 | A | 2/2000 | Damani et al. | 395/500.38 |
| 6,053,947 | A | 4/2000 | Parson | 703/14 |
| 6,106,297 | A | 8/2000 | Pollak et al. | 434/16 |
| 6,134,514 | A | 10/2000 | Liu et al. | 703/17 |
| 6,154,735 | A * | 11/2000 | Crone | 706/45 |
| 6,163,801 | A | 12/2000 | O'Donnell et al. | 709/213 |
| 6,324,495 | B1 * | 11/2001 | Steinman | 703/17 |

OTHER PUBLICATIONS

Defense Modeling and Simulation Office (DMSO), "Facility for Distributed Simulation Systems: Proposed Request for Comments". Version 1.2. Jun. 1998. Chapters 1, 8.*

Defense Modeling and Simulation Office (DMSO), "High Level Architecture". Last updated on Sep. 13, 2004. https://www.dmso.mil/public/transition/hla.*

Corba® Basics, "What Is Corba? What does it do?", © 1997-2004. http://www.omg.org/gettingstarted/corbafaq.html.*

Fujimoto, R. "Parallel Discrete Event Simulation". Communications of the ACM. vol. 33, Issue 10. Oct. 1990. pp. 30-53.*

Fujimoto, R. "Parallel and Distributed Discrete Event Simulation". Proc. 25th Winter Simulation Conference. Dec. 1993. pp. 106-114.*

Jones, D. "Concurrent Simulation: An Alternative to Distribtued Simulation". Proc. 18th Winter Simulation Conference. Dec. 1986. pp. 417-423.*

IEEE Std. 1278.1-1995. IEEE Standard for Distributed Interactive Simulation—Application Protocols.*

Bain, W.L. "Parallel Discrete Event Simulation Using Synchronized Event Schedulers." Proc. of the 5th Distribtued Memory Computing Conference, 1990. Apr. 8-12, 1990. pp. 90-94.*

Bain, W.L. "Air Traffic Simulation: An Object Oriented, Discrete Event Simulation on the Intel iPSC/2 Parallel System." Proc. of the 5th Distributed Memory Computing Conference, 1990. Apr. 8-12, 1990. pp. 95-100.*

Liu, J. et al. "A Hierarchical Hybrid System Model and Its Simulation." IEEE Conf. on Decision and Control. Dec. 1999.*

Liu, H. et al. "Modeling Distributed Hybrid Systems in Ptolemy II." Proc. of the 2001 American Control Conf. Jun. 25-27, 2001.*

Liu, J. et al. "Component-Based Hierarchical Modeling of Systems with Continuous and Discrete Dynamics." Proc. of the 2000 IEEE Int'l Symposium on Computer-Aided Control System Design. Sep. 25-27, 2000. pp. 95-100.*

Johansson, R. "Identification of Continuous-Time Models." Proc. of the 31st IEEE Conf. on Decision and Control. 1992. vol. 1, pp. 50-55.*

Taylor, J.H. et al. "Modeling and Simulation of Hybrid Systems in MATLAB." IFAC World Congress, Jul. 1996.*

"Distributed Heterogeneous Simulation (DHS)" from the P.C. Krause and Associates website. http://new.pcka.com/products/distsim.html. Printed Mar. 23, 2006.*

L. Birta, O. Abou-Rabia; *Parallel Block Predictor-Corrector Methods for Ode's*, IEEE Trans. Computers, C-36:3 (Mar. 1987).

O. Abou-Rabia, L.G. Birta, M. Chen; *A Comparative Evaluation of the BPC and PPC Methods for the Parallel Solution of Ode's*; Trans. Soc. for Computer Sim.; 6:4:pp. 265-290.

M.L. Crow, M. Illie; *The Parallel Implementation of the Waveform Relaxation Method for Transient Stability Simulations*; IEEE Trans. Power Systems; 5:3:pp. 922-932 (Aug. 1990).

H. Mori, K. Takeda; *Parallel Simulated Annealing for Power System Decomposition*; IEEE Trans. Power Systems; 9:2:pp. 785-795 (May 1994).

K. K. Fung, et al.; *Concurrent Simulation of Decouple Power Electronics Circuits* Euro. Power Elec.; 18-23 (Sep. 1993).

L.G. Birta, M. Yang; *Some Stepsize Adjustment Procedures for Parallel ODE Solvers*; Trans. Soc. for Computer Sim., 12:4:pp. 303-324.

N. Huu Cong; *A Parallel DIRK Method for Stiff Initial-Value Problems*; J. Comp. and Appl. Math., 54:pp. 121-127 (1994).

P.J. van der Houwen et al.; *Parallel Iteration Across the Steps of High-Order Runge-Kutta Methods for Nonstiff Initial Value Problems*; J. of Comp. and Appl. Math., 60:pp. 309-329 (1995).

W.A. van der Veen; *Step-Parallel Algorithms for Stiff Initial Value Problems*; Comp. in Math. Appl.; 30:11:pp. 9-23 (1995).

J.J.B. de Swart, J.G. Blom; *Experiences with Sparce Matrix Solvers in Parallel ODE Software*; Comp. In Math. Appl.; 31:9:pp. 43-55 (1996).

I.M. Llorente, et al.; *Some Aspects About the Stability of Scientific Applications on Parallel Architectures*; Parallel Comp. 22:pp. 1169-1195 (1996).

P. Amodio, L. Brugnano; *A Note on the Efficient Implementation of Implicit Methods for ODEs*; J. of Comp. and Appl. Math.; 87:pp. 1-9 (1997).

L.G. Birta and L. Yang; *Some $P(EC)^mE$ Methods for Parallel Solution of ODEs*; Math and Comp. in Sim.; 43:pp. 171-182 (1997).

I. Martin, F. Tirado; *Relationships Between Efficiency and Execution Time of Full Multigrid Methods on Parallel Computers*; IEEE Trans. Parallel and Dis. Sys.; 8:6:pp. 562-573 (Jun. 1997).

E. Messina, et al.; *Parallel Interactive Linear Solvers for Multistep Runge-Kutta Methods*; J. of Comp. and Appl. Math.; 85:pp. 145-167 (1997).

J. Huang, et al.; *A Model and Design of a Fully Distributed Computing Environment for Virtual Reality*; IEEE, pp. 160-168 (Mar. 1997).

Z. Yao, et al.; *Power System Simulation by an Improved WRM*; IEEE Int'l. Conf. on Control Appl.; pp. 80-585 (Oct. 5-7, 1997).

S. Veseli; *Multidimensional Integration in a Heterogeneous Network Environment*; Comp. Physics Comm.; 108:pp. 9-19 (1998).

N. Adbel-Jabbar, et al.; *A Partially Decentralized State Observer and Its Parallel Computer Implementation*; Ind. Eng. And Chem. Res.; 37:pp. 2741-2760 (1998).

H. Vin; *Supporting Next-Generation Distributed Applications*; IEEE Project Reports, pp. 78-83 (Jul.-Sep. 1998).

E. deDoncker, et al.; *Large-Scale Parallel Numerical Integration*; J. of Comp. and Appl. Math. 112:pp. 29-44 (1999).

P.J. van der Houwen and E. Messina; *Parallel Adams Methods*; J. of Comp. and Appl. Math.; 101:pp. 153-165 (1999).

N. Abdel-Jabbar, et al.; *A Multi-rate Parallel-Modular Algorithm for Dynamic Process Simulation Using Distributed Memory Multicomputers*; Comp. and Chem. Eng.; 23:pp. 733-761 (1999).

M. Pruetim, et al.; *An Environment to Develop Parallel Code for Solving Partial Differential Equation-Based Problems*; J. of Sys. Arch.; 45:pp. 543-554 (1999).

T. Kato and T. Kataoka; *Circuit Analysis by a New Multirate Method*; Elec. Eng. In Japan; 126:4:pp. 55-62 (1999).

L. Pollini and M. Innocenti; *A Synthetic Environment for Dynamic Systems Control and Distributed Simulation*; IEEE Con. Sys. Mag.; pp. 49-61 (Apr. 2000).

H. Zhang; *A Note on Windowing for the Waveform Relaxation.*

T. Sterling, et al.; *Achieving a Balanced Low-Cost Architecture for Mass Storage Management Through Multiple Fast Ethernet Channels on the Beowulf Parallel Workstation.*

T. Sterling, et al.; *Beowulf: A Parallel Workstation for Scientific Computation.*

C. Reschke, et al.; *A Design Study of Alternative Network Topologies for the Beowulf Parallel Workstation.*

T. Sterling, et al.; *Communication Overhead for Space Science Applications on the Beowulf Parallel Workstation.*

Dommel, *Digital Computer Solution of Electromagnetic Transients in Single- and Multiphase Networks*, IEEE Transactions on Power Apparatus and Systems, vol. PAS-88, No. 4, Apr. 1969.

Masuzawa, Fukui, and Smith, *Cardiovascular simulation Using a Multiple Modeling Method on a Digital Computer-Simulation of Interaction Between the Cardiovascular System and Angiotensin II*, Little, Brown and Company, 1992.

Quinn, *Parallel Computing: Theory and Practice*, McGraw-Hill Series in Computer Science, 1994.

Burrage, *Parallel and Sequential Methods for Ordinary Differential Equations*, Oxford Press, 1995.

Ferscha, *Parallel and Distributed Simulation of Discrete Event Systems*, Handbook of Parallel and Distributed Computer, McGraw-Hill, 1995.

*MPI-2: Extensions to the Message-Passing Interface*, Message Passing Interface Forum, University of Tenneessee, Knoxville, Tennessee, 1995, 1996, 1997.

Xavier and Iyengar, *Introduction to Parallel Algorithms*, Wiley Series on parallel and Distributed Computing, 1998.

Berry, Oma and Lomow, Greg; *Constructing Object-Oriented Distributed Simulations*; Third Israel Conference on Computer Systems and Software Engineering; pp. 117-121; 1988.

Cutkosky, Mark R., et al.; *PACT: An Experiment in Integrating Concurrent Engineering Systems*; Computer, vol. 26, issue 1, pp. 28-37; Jan. 1993.

Franklin, Manoj and Saluja, Kewal; *Embedded RAM Testing*; pp. 29-33; May 1995.

Furuichi, M., et al.; *The Applicability of High Level Architecture (HLA) to Distributed Cooperative Processing Systems*; IEEE International Conference on Systems, Man, and Cybernetics; vol. I, pp. 6-11; 1999.

Lane, D. M., et al.; *Mixing Simulations and Real Subsystems for Subsea Robot Development: Specification and Development of the Core Simulation Engine*; Oceans '98 Conference Proceedings, vol. 3, pp. 1382-1386; Jun. 1998.

* cited by examiner

DISTRIBUTED SIMULATION

REFERENCE TO RELATED APPLICATION

Priority is claimed to U.S. Provisional Patent Application No. 60/212,695, filed Jun. 19, 2000.

DISTRIBUTED SIMULATION

This invention was made with Government support under Contract F33615-99-C-2911 awarded by the U.S. Department of Defense. The United States Government has certain rights in the invention.

BACKGROUND

The present invention relates to computer programs that simulate systems. More specifically, the present invention relates to simulation systems using a distributed computer network, wherein subsystems can be simulated independently, the subsystem simulations communicating the values of input/output variables to simulate subsystem interaction. Present methods of simulating complex systems suffer from limitations in security, interoperability, cross-platform communication, and other functional areas. Many simulation platforms fail to enable distributed simulation at all, limiting the complexity of systems that can be modeled as a function of the computing and storage capacity of a single device. Simulation of complex systems (those of a tank or aircraft, for example) in a reasonable time is extremely difficult, if not impossible, using widely available computing systems.

Furthermore, where multiple vendors are responsible for the various subsystems of a larger system, security and proprietary concerns may inhibit or prevent formation of cooperative simulation systems comprising simulation models of each subsystem provided by each vendor. In some contractual and/or regulatory scenarios, vendors may be forced against their preferences to disclose their simulation models to other vendors or authorities, so that simulations may be conducted of the whole system.

There is thus a need for further contributions and improvements to distributed simulation technology.

SUMMARY

It is an object of the present invention to provide a novel simulation system. Another object is to provide a simulation system in which various subsystem simulations are written in different languages and executed by different programs running on different computing devices, yet the subsystem simulations communicate to simulate operation of the combination of subsystems. Yet another object is to provide a simulation system in which various parts of the simulation can be executed using different integration methods and/or parameters from other parts of the simulation.

These objects and others are achieved by various forms of the present invention. One form of the present invention is a unique distributed simulation system. Further forms include a system in which a plurality of processors each executes a separate program to independently simulate a different portion of a physical system. At various points in time, a first one of the processors communicates messages to a second one of the processors to convey information regarding the state of the simulated subsystem at a particular point in simulation time. The second processor uses the state-related information from the first processor to execute its model of the second portion of the system. In some embodiments of this form, the messages are sent at constant intervals in simulation time, while in other embodiments messages are sent at constant intervals in real time. In still other embodiments, the messages are sent at variable intervals depending on the circumstances, such as a function of one or more variables, the pattern of change in one or more variables, detected network congestion or delay, or the behavior of the other state variables (in the first model, second model, another model, or a combination thereof).

In another form of the invention, one program exposes an interface associated with a first model, while a second program exposes an interface associated with a second model. The first interface permits access by the second program to a program-controlled set of state-related information of the first model, while preventing access by the second model to a substantial portion of the first program or model. In some embodiments of this form, the second program's interface allows the first model to access a program-controlled set of state-related information of the second model, while preventing access by the first model to at least a substantial portion of the second program or model.

In yet another form of the invention, a system monitor application provides control and coordination of subsystem simulations. In some embodiments of this form, each subsystem model allows itself to be started, stopped, configured, and/or connected with other models by the system monitor application. In other embodiments, a model accepts and serves requests to periodically transmit certain state-related information to one or more data output applications, which may produce one or more graphs of those values (or of a function of those values). In some of these embodiments, a sequence of values of one or more state-related variables is broadcast to a plurality of possible recipients.

DESCRIPTION OF THE PREFERRED EMBODIMENTS

Figure 1:
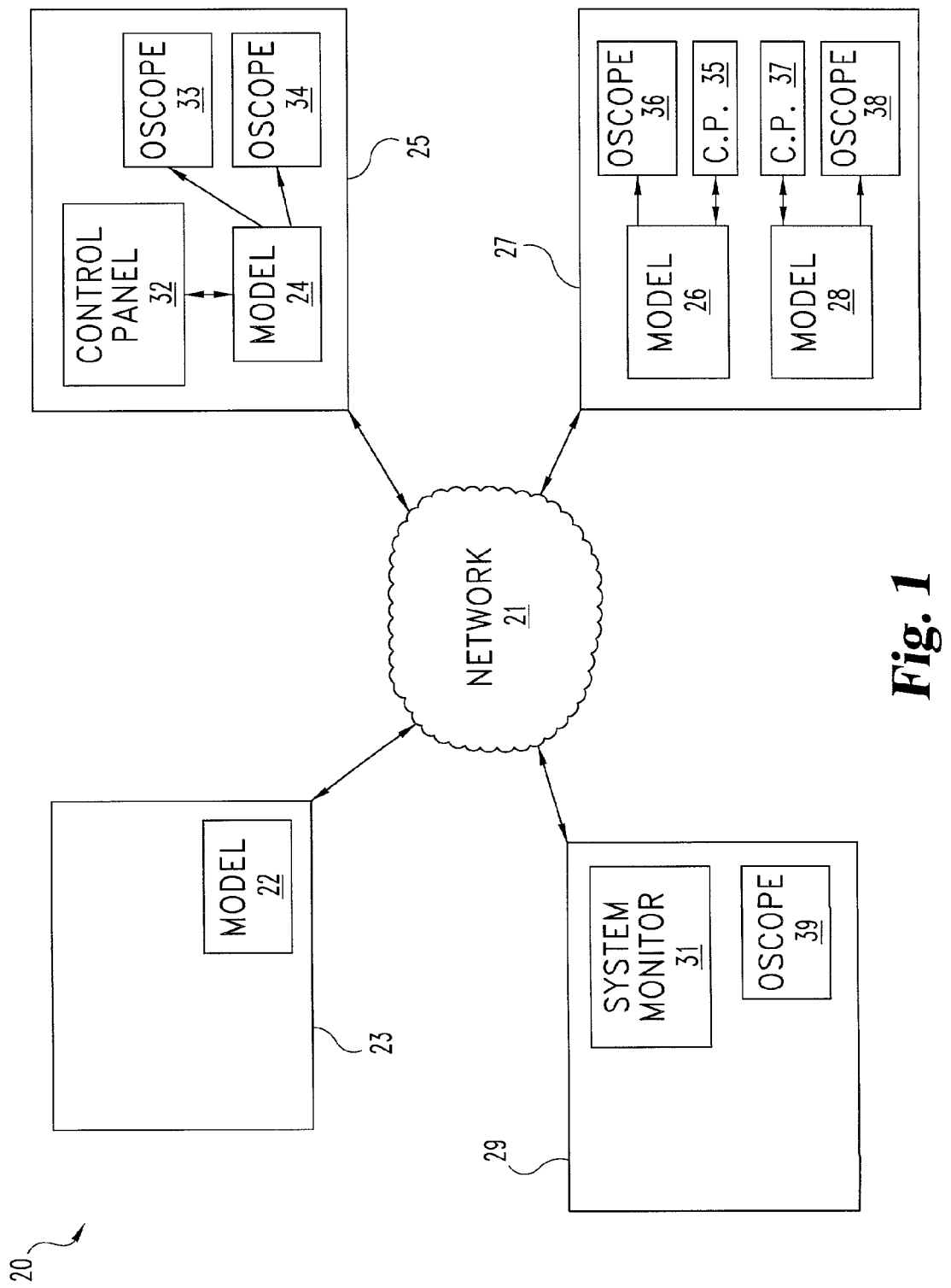
FIG. 1 is a block diagram of a distributed simulation system.

For the purpose of promoting an understanding of the principles of the present invention, reference will now be made to the embodiment illustrated in the drawings and specific language will be used to describe the same. It will, nevertheless, be understood that no limitation of the scope of the invention is thereby intended; any alterations and further modifications of the described or illustrated embodiments, and any further applications of the principles of the invention as illustrated therein are contemplated as would normally occur to one skilled in the art to which the invention relates.

Figure 2:
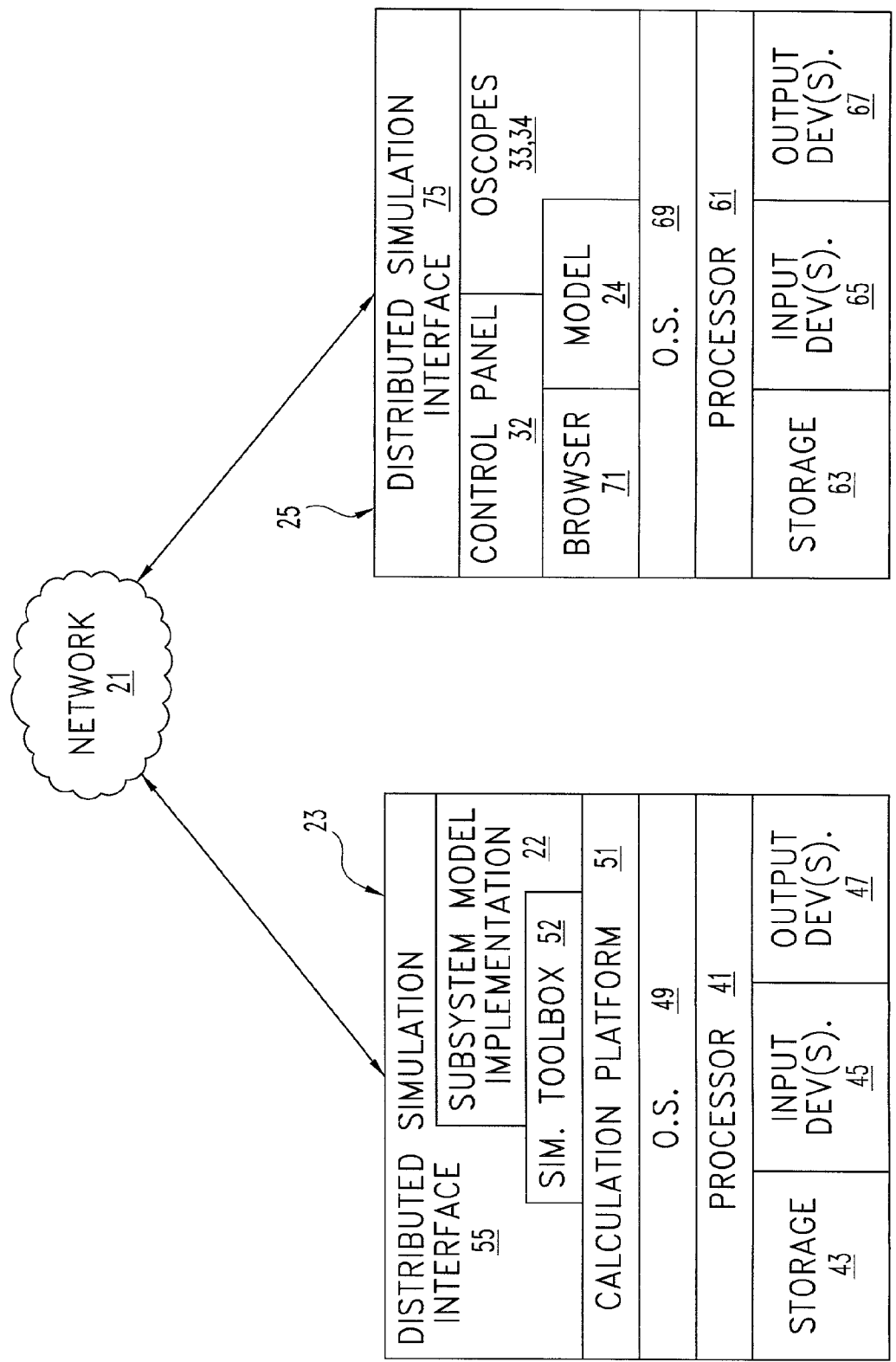
FIG. 2 is a block diagram of two embodiments of model host computers in a distributed simulation system.
Figure 3:
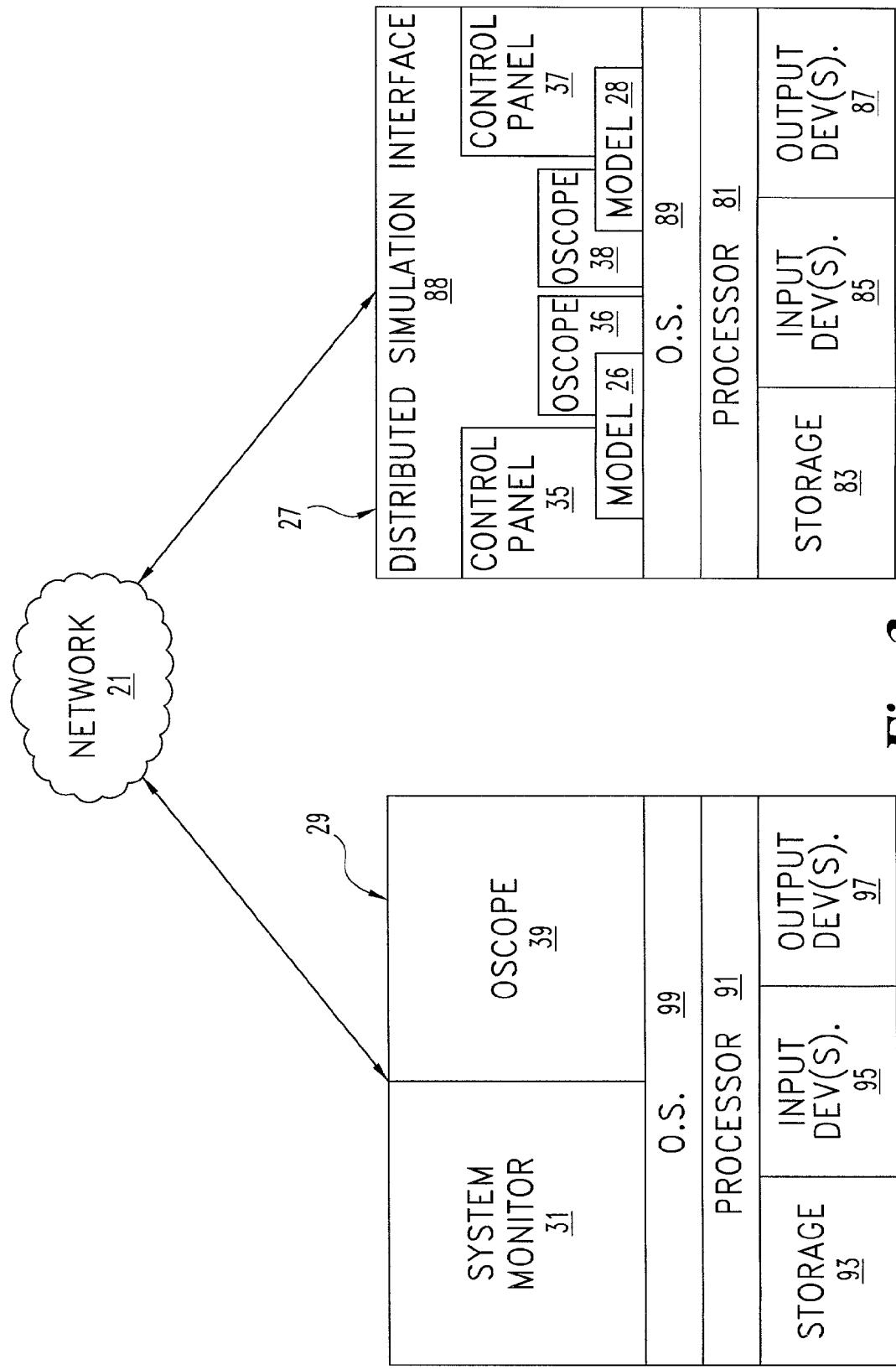
FIG. 3 is a block diagram of a system monitor computer and a model host computer in a distributed simulation system.

Generally, the distributed simulation system illustrated in FIGS. 1-3 provides parallel implementations of various portions or aspects ("subsystems") of a physical system. In this illustrated embodiment, computer 29 starts, stops, configures, and controls connections and interactions between a plurality of models 22, 24, 26, 28, running on model host computers 23, 25, 27. Each model 22, 24, 26, 28 implements a model of one or more subsystems and makes that implementation available for connection to models of other portions of the system. A consistent external communication interface (discussed in further detail below) for various hardware and software platforms allows each subsystem to be modeled on a different simulation platform and/or operating system, and further allows different vendors of different subsystems to make models of their subsystems available for simulation in combination with the rest of the system.

It should be noted that the present description can most easily be understood in terms of simulation of a physical system with distinct physical subsystems. "System" as used herein, however, is not intended to be limited to a physical arrangement of components. The concept should be understood to include the subject of any simulation. Likewise, a "subsystem" as used in the present application is not necessarily a physically distinct set of components. For example, one independently modeled "subsystem" might be the heat transfer aspects of an item, while another "subsystem" models the electronic aspects of the item.

The implementation of a model for simulation purposes may be programmed by one or many programmers or organizations of programmers, in the same language as other models in the system, or in a different language.

System 20 will now be discussed in further detail with continuing reference to FIG. 1. Network 21 interconnects computers 23, 25, 27, and 29. Models 22, 24, 26, 28, running on those computers as illustrated collectively model a complete system, by each modeling at least one subsystem and interacting to communicate the states of the simulated interfaces between the subsystems at various intervals in real or virtual time as will be discussed in further detail below. Other applications involved in the distributed simulation system 20 are shown in FIG. 1 in various configurations. A simple model host computer 23 runs a single model 22, which is accessible to other models 24, 26, 28 and other applications (such as system monitor 31) via network 21.

In many embodiments of the invention, however, resources will be available within a single host computer to execute additional applications. A common configuration is shown in relation to computer 25 of FIG. 1. There, model 24 simulates one or more subsystems, and control panel 32 issues start, stop, parameter setting, connection-related, and other commands as will occur to those skilled in the art. OSCOPE applications 33 and 34 display the values of one or more variables or functions of variables of model 24 over time. It has been found experimentally that this grouping of applications is a reasonably effective use of resources on a single computer. When the resources required by a model are too great to support the additional applications (for example, if the model were a bottleneck in the simulation system), the other components may be off-loaded from the host computer and executed on a "neighboring" computer on a local-area network, for example.

In some situations, multiple models can be executed on a single computer, as shown in relation to computer 27 in FIG. 1. Computer 27 runs models 26 and 28, which are each associated with a control panel (35 and 37, respectively) and OSCOPE (36 and 38, respectively).

System monitor 31 runs on computer 29 and controls parameters of and connections between models 22, 24, 26, 28. In this exemplary embodiment, while control panels 32, 35, 37 each control and monitor a single model (24, 26, 28, respectively), system monitor 31 is designed to manage the whole distributed simulation system 20. Also running on computer 29 is OSCOPE 39, which monitors one or more variables or functions of variables of model 22, for example.

A "system monitor" application 31 (also discussed in more detail below) running on computer 29 sets parameters of the models, controls the connections between the models, monitors their functioning, and logs relevant facts, parameters, and events in the simulation. Several functions of system monitor 31 will be detailed further below.

Certain functional components of computers 23 and 25 will now be discussed with reference to FIG. 2. Model host computer 23 comprises processor 41, which in one embodiment is a conventional, integrated circuit microprocessor arrangement, such as one or more PENTIUM III or PENTIUM 4 processors (supplied by INTEL Corporation of Santa Clara, Calif., USA), Athlon processors (supplied by Advanced Micro Devices, Inc., of Sunnyvale, Calif., USA), or PowerPC processors (supplied by the Semiconductor Products Sector of Motorola, Inc., of Austin, Tex., USA).

Storage 43 provides the data storage required by computer 23, including for example storage for program, model, log, and other data. Storage 43 may include one or more types of solid-state electronic memory, magnetic memory, or optical memory, just to name a few. By way of non-limiting example, storage 43 may include solid-state electronic Random Access Memory (RAM), Sequentially Accessible Memory (SAM) (such as the First-In, First-Out (FIFO) variety or the Last-In, First-Out (LIFO) variety), Programmable Read-Only Memory (PROM), Electrically Programmable Read-Only Memory (EPROM), or Electrically Erasable Programmable Read-Only Memory (EEPROM); an optical disc memory (such as a DVD or CD-ROM); a magnetically encoded hard disc, floppy disc, tape, or cartridge media; or a combination of any of these memory types. Also, storage 43 may be volatile, nonvolatile, or a hybrid combination of volatile and nonvolatile varieties.

Optional input device(s) 45 may include a keyboard, mouse, track ball, light pen, and/or microphone, to name just a few representative examples. Also, optional output device (s) 47 may include one or more monitors, loudspeakers, printers, and/or other recording devices, again to name just a few representative examples.

Operating system 49 is a general-purpose operating system, such as a WINDOWS operating system (published by Microsoft Corporation of Redmond, Wash., USA) or a MAC OS (published by Apple Computer, Inc., of Cupertino, Calif., USA). Other operating systems may be used without undue experimentation by those skilled in the art.

Running on operating system 49 is calculation platform 51, which is a general-purpose computation and analysis package such as MATLAB (published by The MathWorks, Inc., of Natick, Mass., USA). Some alternative simulation program and platform configurations are discussed below in relation to computers 25 and 27. In the case of computer 23, however, an additional simulation toolbox 52 known as SIMULINK (also published by The MathWorks, Inc.) is included to allow the incorporation of the distributed simulation API for the subsystem model implementation 22. Model 22 is, in this example, written in the MATLAB programming language with references to procedures and/or objects defined in the SIMULINK toolbox 52 and the distributed simulation interface 55. Interface 55 provides an API comprising functions that enable model 22 to programmatically control connections from other computing devices and to process data exchanged through them, as discussed further herein.

Computer 25 is controlled by processor 61 using programs stored in storage 63 (where processor 61 and storage 63 may be of any suitable type, as discussed above in relation to processor 41 and storage 43, respectively). Optional output device(s) 67 and optional input device(s) 65 again facilitate interaction with human users. Operating system 69 is, in this example, a WINDOWS 2000 operating system, published by Microsoft Corporation. Model 24 executes on OS 69 as a stand-alone application written in one or more system programming languages, such as C, C++, Fortran, Visual Basic, or JAVA.

Browser 71 enables access to and viewing of resources available through network 21, such as Hypertext Markup Language (HTML) files and JAVA applets (such as system control applet 32). Browser 71 may be, for example, Netscape Navigator (published by Sun Microsystems, Inc., of Palo Alto, Calif., USA). OSCOPE applications 33 and 34 read state-related information from model 24 and send it as output to the user via output device(s) 67. Like interface 55, distributed simulation interface 75 provides communication-related functionality to model 24.

FIG. 3 shows the components of computers 27 and 29 (see also FIG. 1). In computer 27, storage 83, optional input device(s) 85, and optional output device(s) 87 are analogous to (though not necessarily the same as) 43, 45, and 47. Here, again, subsystem model implementations 26, 28 are stand-alone applications written in one or more system programming languages, such as C, C++, Fortran, Visual Basic, or JAVA, to name just a few nonlimiting examples. Processor 81 is a custom-designed, application-specific integrated circuit (ASIC) specially adapted for simulation computations. A custom-designed simulation operating system 89 runs subsystem model implementations 26 and 28, which communicate with each other and with other models in system 20 via distributed simulation interface 88. Control panel application 35 and OSCOPE application 36 connect to model 26 and run on simulation operating system 89, which also runs control panel 37 and OSCOPE 38 in conjunction with model 28. System monitor application 31 runs on operating system 99 to provide command and control functionality for system 20 as summarized above and discussed in more detail below. OSCOPE application 39 also runs on operating system 99, displaying to the user at computer 29 an output of state-related information from model 22 on computer 23 (see FIG. 1).

Computer 29 includes processor 91, storage 93, input device(s) 95, and output device(s) 97 (analogous to, but not necessarily the same as, corresponding components in computer 23; namely, components 41, 43, 45, and 47). Operating system 99 is, for example, a UNIX or UNIX-like operating system such as Red Hat Linux (published by Red Hat, Inc., of Durham, N.C., USA).

While the above description relating to FIGS. 1-3 illustrates several uses and arrangements of computing resources, and several illustrations of connections and relationships among components, applications, applets, models, and other physical and functional parts of system 20, it should be noted that those skilled in the art will be able to implement distributed simulation systems according to the present invention with these or other physical and/or virtual configurations. For example, any functionality described herein can be implemented in any computing device in communication with at least one other component in the system.

The process for carrying out a simulation according to one embodiment of the present invention will now be discussed in broad terms in relation to FIG. 4, with continuing reference to items shown in and discussed in relation to FIGS. 1-3. Additional detail regarding the control of connections among models in a selected embodiment of the present invention will be discussed below in relation to FIGS. 7A-7C. The process 100 in FIG. 4 starts at START point 101. The various models are started at block 110. In various embodiments, this event may be initiated for each model by an action of a local user (such as a gesture in a desktop graphical user interface (GUI)), by a remote user (for example, through a web browser or by way of another signal), or by an automated process (such as invocation by a task scheduler), to name just a few possible triggers. In some of these embodiments, the operating system 49, 69, 89, 99, calculation platform 51, simulation toolbox 52, subsystem model implementations 22, 24, 26, 28, and distributed simulation interface software 55, 75, 88 are loaded into memory and initialized with simulation parameters as will be understood by those skilled in the art.

At block 120, parameters (such as capacitance of a capacitor, or density of fuel in the system being simulated) for the various models 22, 24, 26, 28 are set, for example, by the system monitor application 31 or the control panel 32, 35, 37 associated with each particular model. In various embodiments, these parameters may be provided by a local configuration file, user input, a signal from system monitor 31 or a control panel, or other source as would occur to one skilled in the art.

Models may be connected to and/or disconnected from other models at block 130, again under the control of system monitor 31 or the model's respective control panel 32, 35, 37. For example, in some embodiments that use the TCP/IP protocol stack, IP addresses and TCP port numbers are obtained (e.g., from local storage 43, 63, 83, one or more command line parameters, system monitor 31, etc.), and TCP connections are opened.

Connected models exchange control and state-related information at block 140 and export state-related information to an OSCOPE or other monitoring process at block 150. In the example embodiment shown in FIGS. 1-3, subsystem model implementation 24 receives state-related messages from subsystem model implementation 22 that communicate information relating to one or more state variables from subsystem model implementation 22. Subsystem model implementation 24 then uses that information in its simulation. For example, subsystem model implementation 24 will, in some implementations, use the information from the state-related messages as an input to the subsystem being simulated. In some of these embodiments, state-related messages from subsystem model implementation 24 to subsystem model implementation 22 provide information relating to one or more state variables in subsystem model implementation 24 as input(s) to the operation of subsystem model implementation 22.

Other commands are processed by the models at block 160, and it is determined at decision block 170 whether the system 20 should continue operation. If so, process 100 returns to the beginning of the command processing loop at block 120. If system 20 is not to continue operation (negative result) at decision block 170, the process 100 is ended at END point 199.

Figure 4:
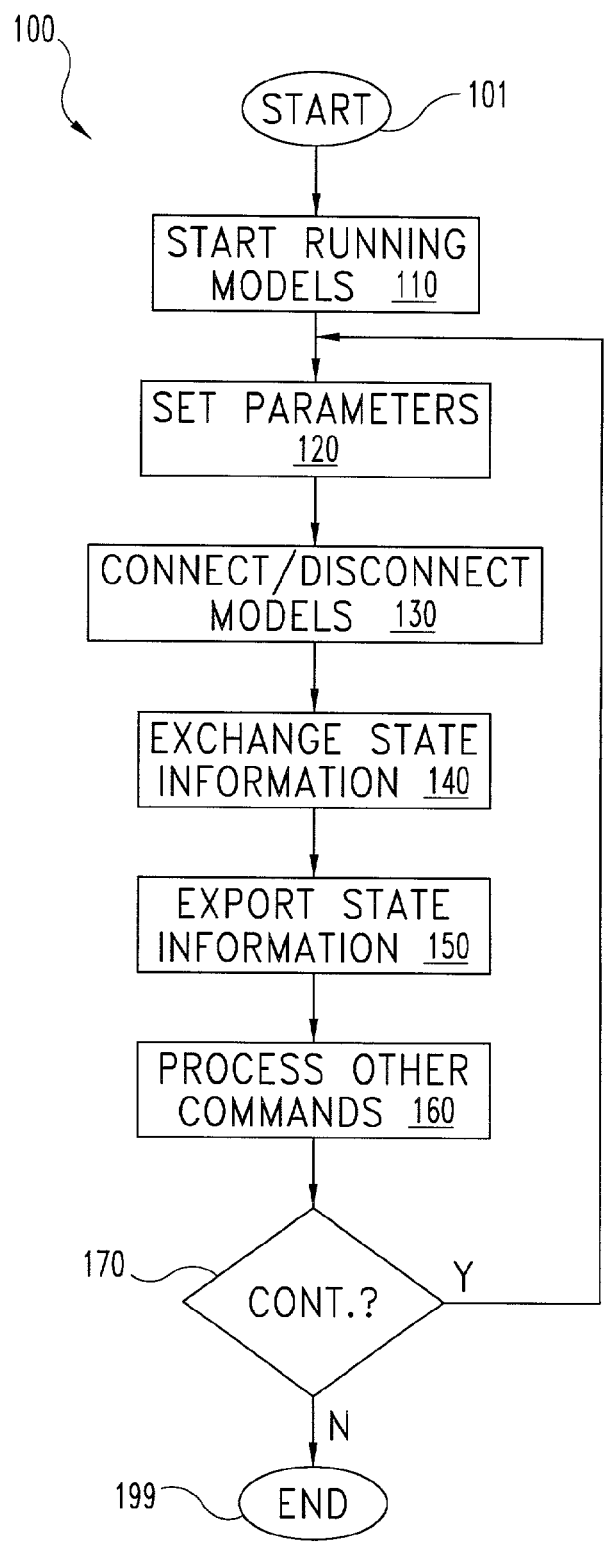
FIG. 4 is a flowchart of a distributed simulation.

While process 100 is illustrated in FIG. 4 as a linear, single-threaded task, it may be implemented in a multi-threaded form, on multiple computing devices, or with an alternative control flow, as would occur to one skilled in the art.

In this exemplary embodiment, distributed simulation interfaces 55, 75, 88 expose an application programming interface (API) for development of the various subsystem model implementations 22, 24, 26, 28. The functions in this API, the ACSL version of which is shown below in Table 1, allow the subsystem model implementation programmer to control the variables that are imported from and exported to other subsystem simulations.

TABLE 1

| Function | Arguments | Description |
|---|---|---|
| COM_INIT (MIN) | MIN - model index number | Initialize a model for distributed processing. |
| ADD_PORT (name, desc., status) | name - string name for the port<br>desc - string that provides a description<br>status - connection status variable | Declares a channel to be used for input and/or output variables/messages. |
| ADD_PORT_VAR_IN (PIN, var) | PIN - port index number<br>var - variable name for input from port | Associates an input variable with a port. |
| ADD_PORT_VAR_OUT (PIN, var) | PIN - port index number<br>var - variable name for output to port | Associates an output variable with a port. |
| ADD_PARAM (name, value) | name - parameter name<br>value - initial value | Declares a simulation variable that can be set by system monitor 31 and/or control panel 32, 35, 37 when this subsystem simulation is initialized or started. A default value is provided. |
| OSCOPE (OIN, t_interval, var1, ..., varN) | OIN - oscope index number<br>t_interval - communication interval<br>var1, ..., varN - variable names | Defines a set of variables for export to an OSCOPE application and the (simulation) time interval between samples. |
| EXCHANGE (PIN t_interval) | PIN - port index number<br>t_interval - communication interval | Sets the rate of data exchange for a given port. |
| COM_LISTEN (t_interval) | t_interval - communication interval | Defines the frequency with which the model will check for new control panel, system monitor, and remote model data connections. |
| COM_CLOSE | No Arguments | Stops the model from listening for connections and exchanging data; frees computing resources allocated to inter-model communication. |

In this exemplary embodiment, port index numbers (PINs) and OSCOPE index numbers (OINs) are sequentially assigned, beginning with zero, each time the ADD_PORT or OSCOPE functions, respectively, are called. Then, when an OSCOPE requests a connection to a particular model, the model connects the requesting application (or applet) to the next available OSCOPE index number, if another exists.

Thus, in the illustrated embodiment, the interval between exchanges of data is set by the programmer of the model using the commands shown in Table 1 before the simulation is executed. Exchanges for a given port occur at regular intervals (which may be the same as or different from the intervals used for other ports) in simulation time, using the model time as a frame of reference. In some alternative embodiments, a real-time or other external frame of reference is used, while in other embodiments, the intervals are dynamically controlled as discussed herein.

The functions shown in Table 1 are provided in various forms to accommodate the various simulation environments that may be available within system 20. For example, the functions may be implemented in a dynamically linked library (.DLL), source code library, device driver, operating system API or other format as would occur to one skilled in the art and be acceptable given the constraints of its implementation environment.

Figure 7A:
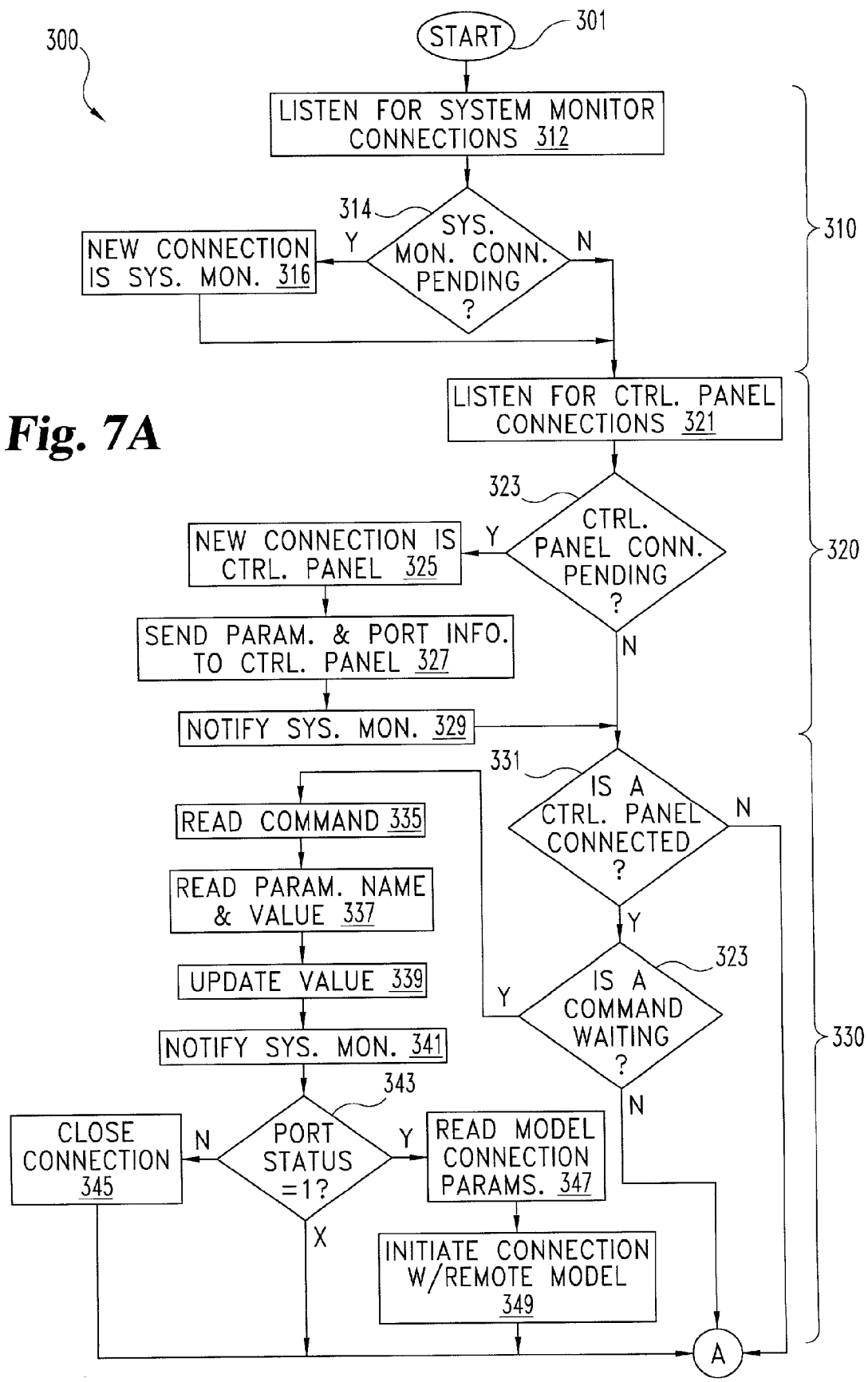
FIGS. 7A-7C are a flowchart of a control message handling loop for use in some distributed simulation systems.
Figure 7B:
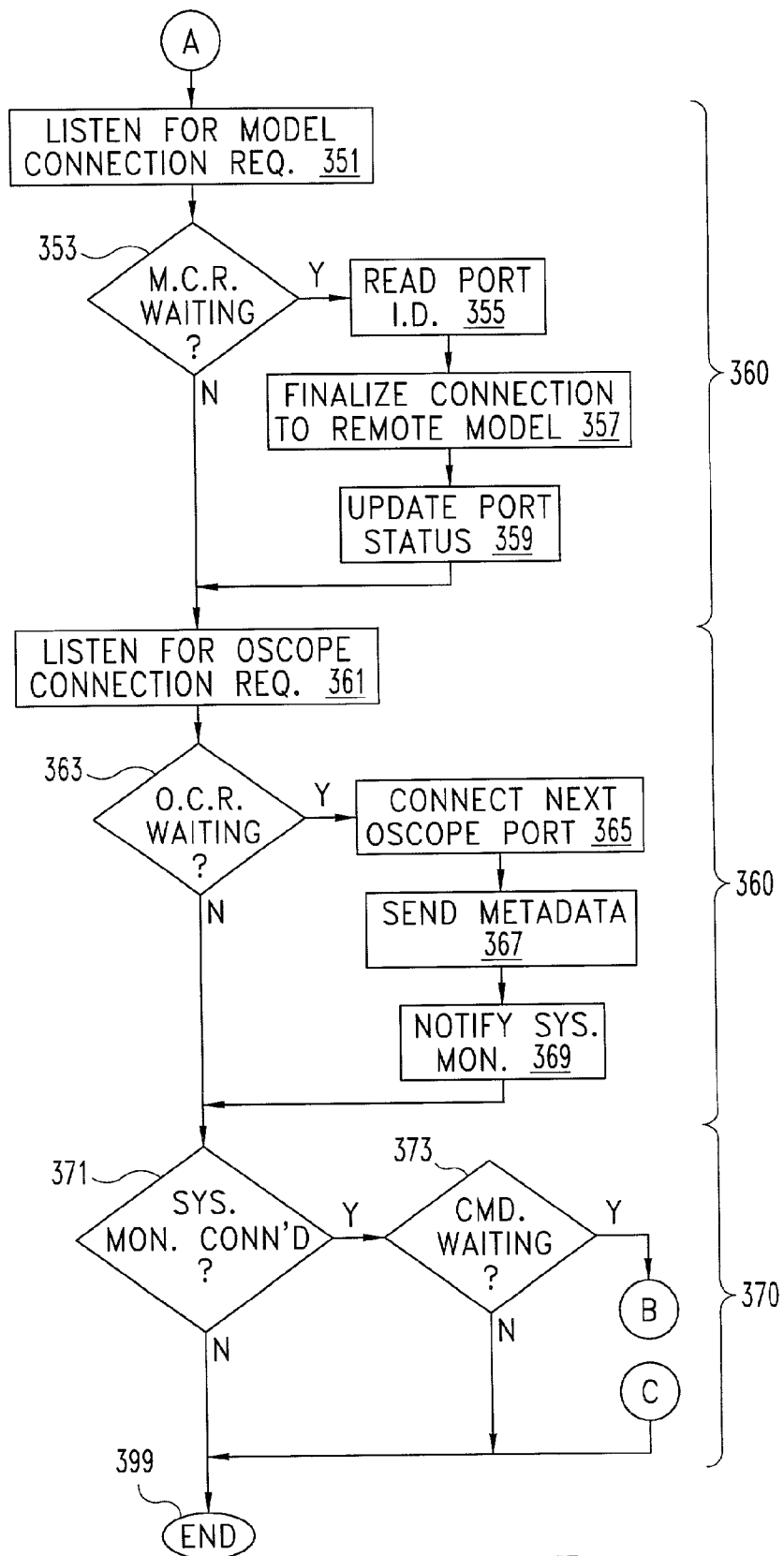
Figure 7C:
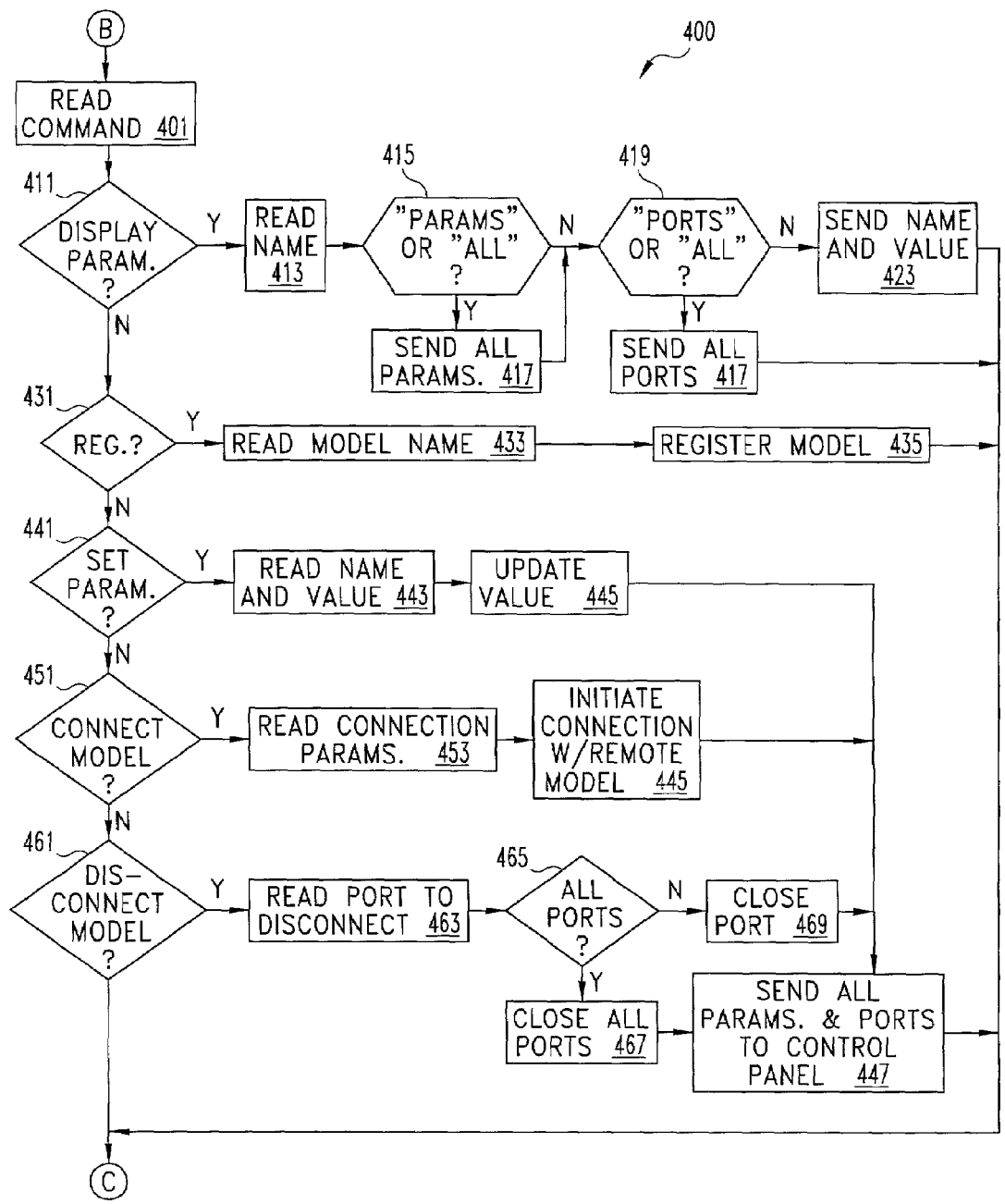

A message-handling loop for processing simulation control messages appears in FIGS. 7A-7C. This example may easily be modified by those skilled in the art to include additional message processing tasks or other events that may occur in a given implementation of the invention. Furthermore, non-message-based control mechanisms may be used in various embodiments of the invention.

A message handling loop 300 for a given model will now be described in relation to FIGS. 7A-7C. To summarize, loop 300 begins at START point 301, handles system monitor connection activity in part 310, handles control panel activity in part 320, handles commands from the control panel in part 330, handles incoming model connection requests in part 350, handles incoming OSCOPE connection activity in part 360, handles system monitor commands in part 370, and ends at END point 399.

In part 310 of loop 300, the model confirms at block 312 that it is listening for incoming connection requests from system monitor programs. If it is determined at decision block 314 that a system monitor connection request is pending (positive result), then at block 316 the system monitor attempting to connect is established as the active system monitor for the local model(s). Then, or if no such connection is pending (negative result at decision block 314), processing in part 310 ends and loop 300 proceeds to part 320.

Loop 300 handles incoming control panel connection activity in part 320 by first confirming in block 321 that the system is listening for incoming control panel connections. If it is determined at decision block 323 that an incoming connection is pending from a control panel application (positive result), the control panel application is established at block 325 as the active control panel. Current parameter and port information for the local model is then sent to that control panel at block 327, and if a system monitor is active, it is notified of the new connection at block 329. At that point, or if it is determined at block 323 that no connection from an external control panel is waiting (negative result), loop 300 proceeds beyond part 320 into part 330.

Loop 300 handles any pending control panel commands at part 330. It is determined at decision block 331 whether a control panel is currently connected to the local model. If not (negative result), loop 300 proceeds beyond part 330 (via placeholder A) to part 350. If it is determined that a control panel is connected (positive result at decision block 331), it is determined at decision block 333 whether a command from that control panel is waiting. If not (negative result at decision block 333), loop 300 proceeds to part 350 (via placeholder A).

If it is determined at decision block 333 that a command is waiting (positive result), the command is read at block 335, and the relevant parameter name and value for a "set parameter" are read at block 337. The given parameter is updated to reflect the new value at block 339, and if a system monitor is connected, it is notified at block 341 of the update.

Decision block 343 implements an optional method for connecting/disconnecting remote models via control panel commands. If the parameter read at block 337 is not a valid port index number ("X" result at decision block 343), loop 300 proceeds to part 350 (via placeholder A). If the parameter name is a valid port index number, and the corresponding port status value is not one (negative result at decision block 343), the connection through that port is closed at block 345, and loop 300 proceeds to part 350 (via placeholder A).

If the port status value is one (positive result at decision block 343), model connection parameters (including, for example, the IP number of the remote model host, the remote model index number, the remote port index number, and the local model index number) are read from the control panel at block 347. A connection between the identified local model and the identified remote model is then initiated at block 349, and loop 300 continues with part 350.

Loop 300 processes incoming connection requests from other models in part 350. At block 351, it is confirmed that the server is listening for model connection requests. If such a request is not waiting (negative result at decision block 353), loop 300 proceeds to part 360. If a model connection request is waiting (positive result at decision block 353), the requested PIN is read at block 355, and a connection to the remote model is finalized at block 357. The internal port status is then updated at block 359, and loop 300 proceeds to part 360.

In part 360, loop 300 handles incoming requests for connections from OSCOPE applications or applets. First, it is confirmed at block 361 that the model is listening for such connections. Then, if no OSCOPE connection request is waiting (negative result at decision block 363), loop 300 proceeds to part 370. If such a request is waiting (positive result at decision block 363), the next available OSCOPE identifier is determined at block 365, and the metadata (the number of variables available via the requested port, the names of those variables, and the name of the model, for example) for that OSCOPE identifier is sent to the OSCOPE application or applet at block 367. At block 369, the active system monitor (if one is connected) is notified of the activity. Loop 300 continues with part 370.

Commands from the system monitor (if one is connected) are processed in part 370 of loop 300. First, it is checked at block 371 whether a system monitor is, indeed, connected. If not (negative result), loop 300 ends at END point 399. If a system monitor is connected (positive result at decision block 371), it is determined at decision block 373 whether a command from that system monitor is waiting to be processed. If no system monitor command is waiting (negative result at decision block 373), loop 300 terminates at END point 399. If a command is waiting (positive result at decision block 373), loop 300 proceeds (via placeholder B) to part 400, shown in FIG. 7C. When processing in part 400 is complete, loop 300 reaches END point 399 and terminates, or repeats by beginning again at START point 301.

At block 401 in loop 400 shown in FIG. 7C, the requested command is read from the system monitor. At decision block 411, it is determined whether the system monitor is requesting display of parameter and/or port data. If so, the name of the item being requested is read at block 413. If that name is "PARAMS" or "ALL" (positive result decision block 415), the names and corresponding values of each parameter of the model are sent at block 417 to the system monitor. Then (or upon a negative result at decision block 415) it is determined at decision block 419 whether the name that was read at block 413 is "PORTS" or "ALL." If so (positive result at decision block 419), the name and status of each port of the model are sent to the system monitor at block 421. If, however, the result at decision block 419 is negative, the name and value of the specified (at block 413) parameter are sent to the system monitor at block 423. After the actions of either block 421 or 423, loop 300 returns (via placeholder C) to the END point 399.

If the command read at block 401 is not a request for display of one or more parameters (i.e., a negative result at block 411), it is determined at decision block 431 whether the command is for the registration of a model. If so, the model name is read at block 433 and the model is registered at block 435. Loop 300 then returns (via placeholder C) to END point 399.

If the command read at block 401 is also not for registration of a model (negative result at decision block 431), it is determined at decision block 441 whether the command was a request to set a parameter value. If so (positive result), the name and new value are read at block 443, and the value of the specified parameter is updated at block 445. Then, for logging, debugging, or other purposes, the names and values of all parameters and ports are sent to the control panel at block 447. Loop 300 then returns (via placeholder C) to END point 399.

If the command read at block 401 is also not a request to set a model parameter (negative result at decision block 441), it is determined at decision block 451 whether the command is a request to connect a local model to a remote model. If so (positive result), the parameters for establishing that connection (see above discussion in relation to block 347) are read at block 453. The requested connection between the remote model and the local model is then initiated and established at block 455. Loop 300 continues at block 447 by sending the values and status of the parameters and ports to the control panel as discussed above, and returns (via placeholder C) to END point 399.

If the command read at block 401 is not a request to connect a model (negative result at decision block 451), it is determined at block 461 whether the command is to disconnect a model. If so (positive result), the port to disconnect is read at block 463. It is then determined at decision block 465 whether all ports have been requested to be disconnected. If so (positive result), all ports are closed at block 467 and loop 300 proceeds with a report to the control panel of parameter and port information at block 447, discussed above. If a specific port was requested to be closed (negative result at decision block 465), that specific port is closed at block 469, and loop 300 continues with the report of parameter and port information at block 447, discussed above.

If the command read at block 401 is determined at decision block 461 not to be a disconnect request, the command is ignored, and loop 300 proceeds (via placeholder C) to END point 399. It should be noted that various embodiments of the present invention may process different, additional, or fewer commands than those discussed in relation to part 400, as would be understood by those skilled in the art. It should also be noted that those skilled in the art will understand other commands to be available via the control panel other than the "set parameter" command described in relation to FIGS. 7A-7C.

It may also be observed that loop 300 illustrates the simultaneous connection of at most one system monitor and one control panel to a given model. While some embodiments of the present invention may operate with both types of control applications being connected, others may prevent the simultaneous connection of both types of control applications, and others may require both to be connected for certain functionality. Still others may allow multiple instances of one or both types of control applications to a given model.

It should also be noted that the discussion of loop 300 has been simplified for easier understanding by omitting details relating to communication protocols being used, acknowledgements being sent and/or expected, and error handling. For example, it is preferred that model, port, OSCOPE, and other identification numbers and handles be validated by distributed simulation interfaces 55, 75, 88 before they are used. In some embodiments, errors are ignored, while in other embodiments, they cause a log entry to be created, alarm to be set off, and/or the system halted.

Figure 5:
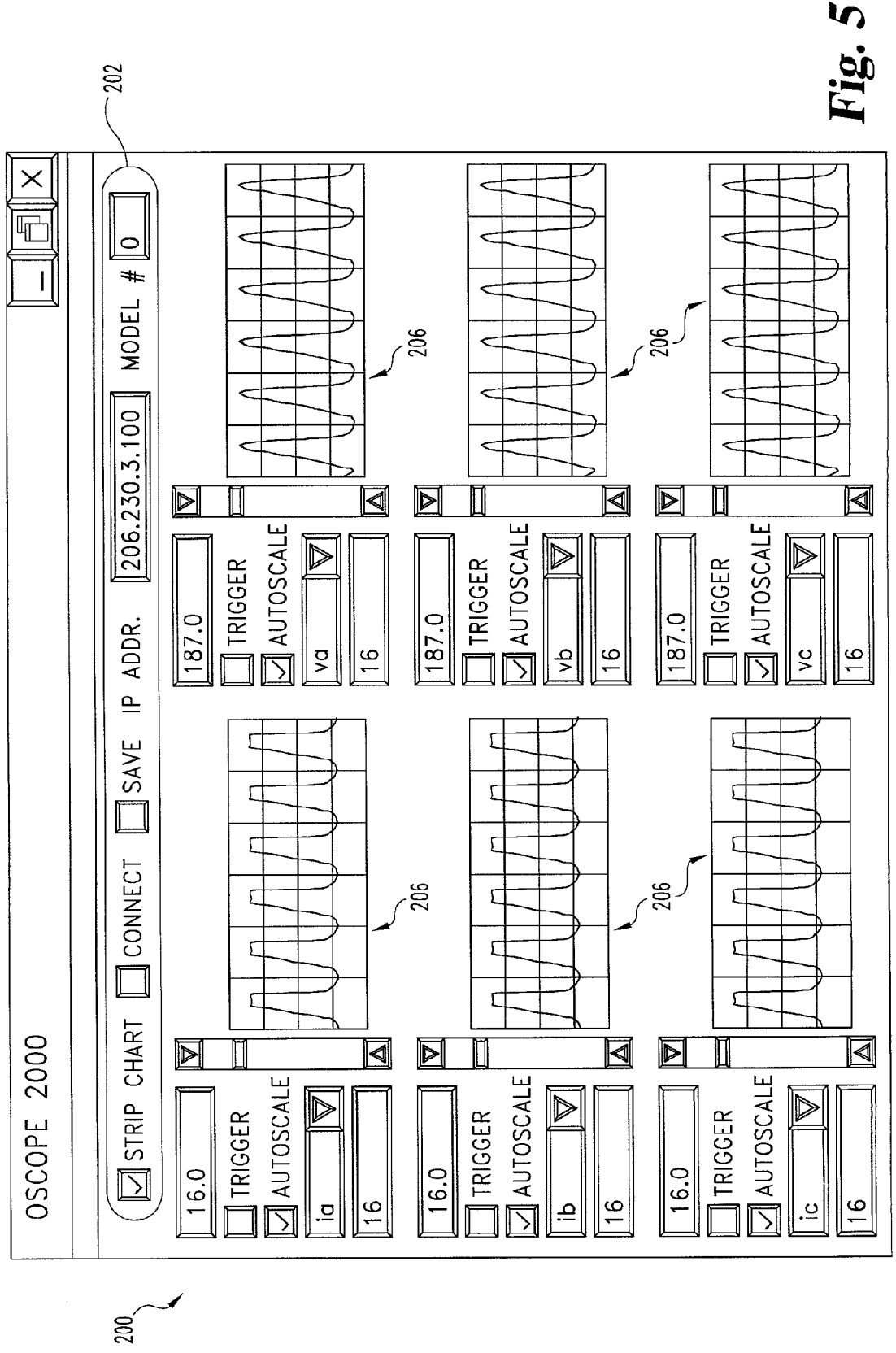
FIG. 5 is a sample view of an OSCOPE application in a distributed simulation system.

An exemplary embodiment of an OSCOPE application according to one form of the present invention will now be discussed with reference to FIG. 5. The OSCOPE application facilitates access to particular state-related information of the various models 22, 24, 26, 28 of system 20. A graphical user interface (GUI) 200, comprising control elements 202, output formatting elements 204, and graph elements 206, facilitates user interaction with the OSCOPE application. Control elements 202 accept the user's selection of a model host (IP address), model index number (MS), and output format for the display. When the user selects the "connect" check box, the OSCOPE application attempts to connect to the selected model.

As the simulation data is received from the selected model, it is displayed in output graphs 206. Various user interface components 204 allow the user to select a wide variety of formats for display, including selecting the variable to graph, scaling the graph in one or more dimensions, automatically scaling the graph using the ranges of data points acquired, displaying repeated traces based on one or more trigger points in one or more signals being graphed, connecting the sample points in the display, and/or transforming the signal through a FFT (fast Fourier transform) to name just a few nonlimiting examples. In this illustration, the output is graphed in graphs 206, which can be saved on any appropriate medium in any appropriate format, including for example a graphics file on a magnetic disk. It will be understood by those skilled in the art that alternative selection, control, and output forms and techniques may be used as required or desired in a particular embodiment. For example, signal data may be printed in the form of a page, plot, or strip chart by a printer that comprises an "output device" 67 in FIG. 2.

Figure 8:
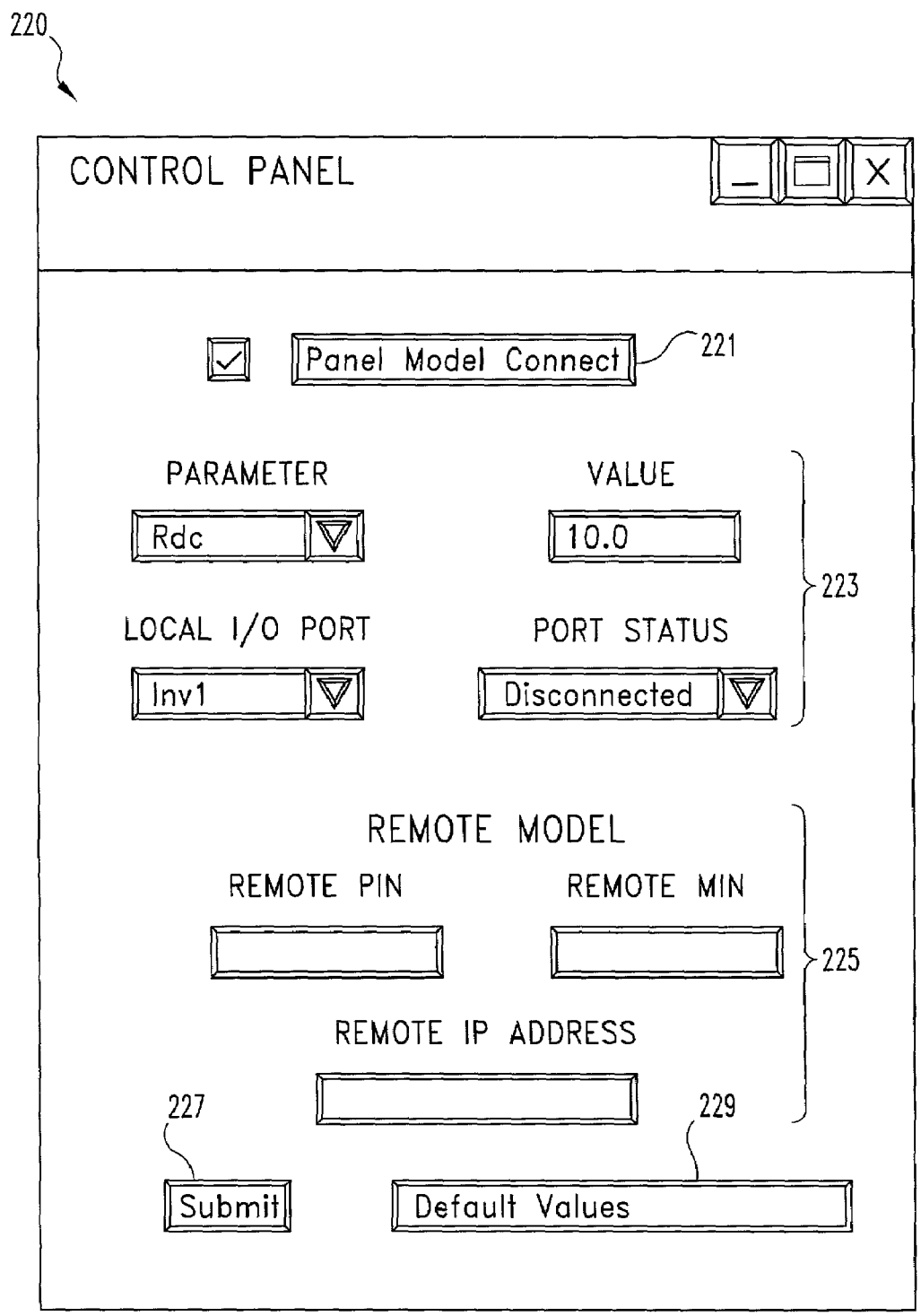
FIG. 8 is a sample view of a control panel application in a distributed simulation system.

A GUI for use with system 20 is illustrated in FIG. 8. Check box 221 establishes or breaks a connection with a particular model based on user input. Model information area 223 reflects the values of the connected model's parameters and the status of the model's ports. The "parameter" and "value" fields can be used to change the parameters of the model to which the control panel is connected, while the "Local I/O Port" and "Port Status" elements can be used to connect/disconnect models to/from the model being controlled. When it is desired to connect to a remote model, the IP address, port identification number, and model identification number are entered in area 225 of GUI 220. In this embodiment, each time the user desires to submit information to the model, the "submit" button 227 is selected, and the information is transmitted to the model using methods, techniques and protocols known in the art. Messages received from the connected model as well as any error messages are shown to the user in text box 229.

As will be apparent to those skilled in the art, traditional and/or alternative components may exist in or be attached to any of the computing devices discussed in this description. Similarly, the networks shown may also connect devices not shown herein, including but not limited to devices that have no role in the distributed simulation.

In one alternative embodiment of the invention, subsystem model implementations 22, 24, 26, 28 are dynamically connected and configured while the model is being executed. In some cases, this dynamic connection simulates physical connection or reconnection of the physical components being modeled in the respective implementations.

In another alternative embodiment, a plurality of simulation programs together simulate a system, each simulation program simulating a different subsystem of the system. In yet another embodiment, different persons specify the parameters and data of the various subsystem models that can be viewed and/or controlled by or through other computers in the network.

Figure 6:
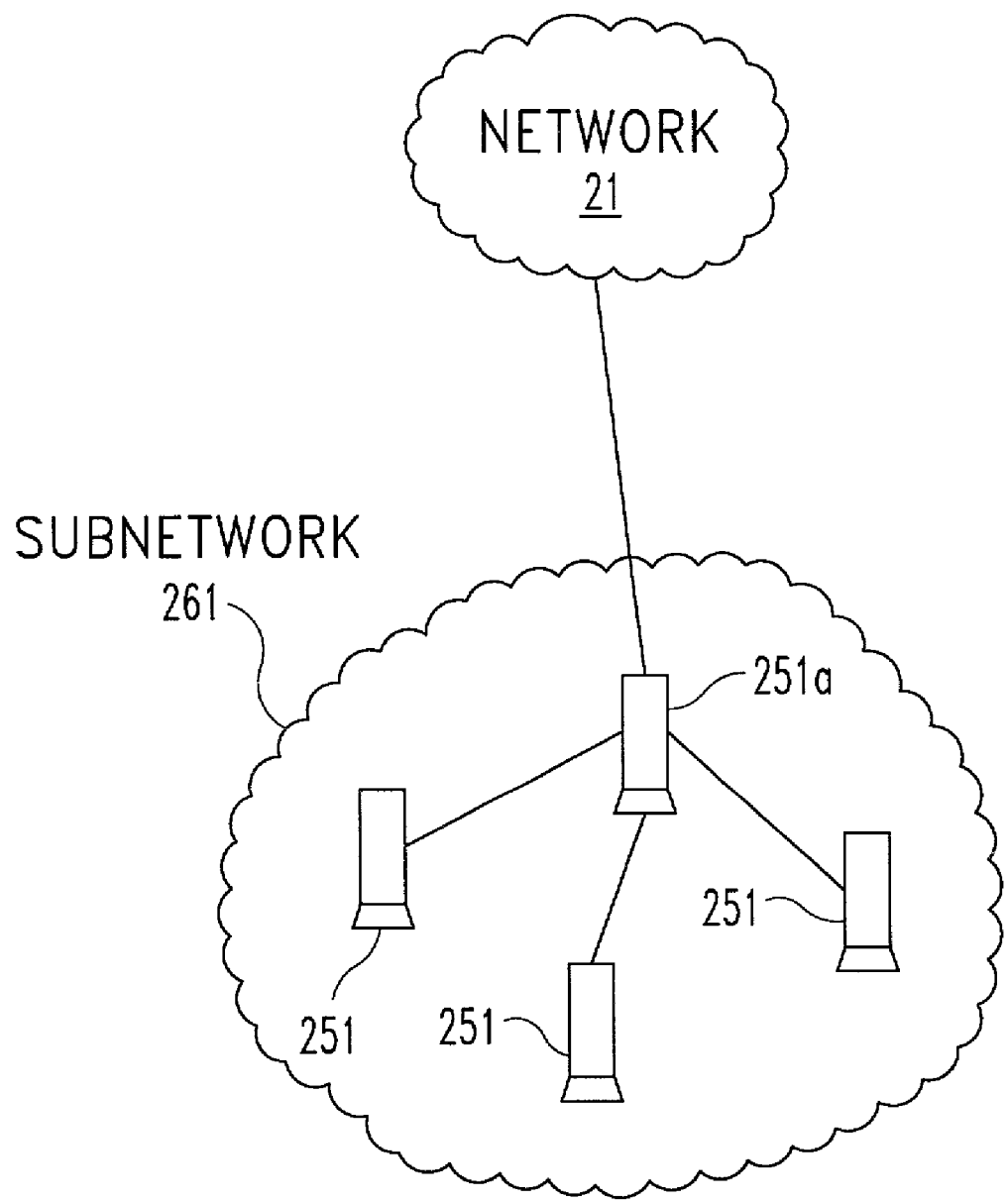
FIG. 6 is a schematic view of a portion of a distributed simulation system including a subnetwork arrangement.

A portion of still another embodiment is shown in FIG. 6. A plurality of computers 251 form a subnetwork 261 in communication with network 21. Each computer 251 models part of a subsystem, while a gateway computer 251a in the subnetwork 261 serves as a communication gateway for state-related messages sent between the computers in the subnetwork 261 and the rest of the network 21. Gateway computer 251a may or may not also host one or more models. In some embodiments of this configuration, the simulations taking place on the non-gateway computers 251 occur independently (i.e., without reliance on state information from any other model). In these cases, gateway computer 251a collects the results of those subsystem simulations, and may aggregate them or pass along the raw data to other models or other components in system 20.

In another form of the present invention, a plurality of interrelated simulation programs are executed on a plurality of computers in a network. The plurality of interrelated simulation programs operate in parallel and exchange data with each other. In some embodiments of this form, the various simulation programs are each executed on the same software package (such as ACSL (published by The Aegis Technologies Group, Inc., of Huntsville, Ala., U.S.A.), Saber (published by Avant! Corporation of Fremont, Calif., U.S.A.), MATLAB/SIMULINK, or EASY 5 (published by The Boeing Company of Chicago, Ill., U.S.A.)). In other embodiments of this form, the various subsystem simulations are executed by a heterogeneous group of software packages (such as an ACSL model on one computer and two MATLAB/SIMULINK models, each on another separate computer).

In one embodiment of this form, the plurality of simulation programs together simulate a real system, wherein each simulation program simulates a different real subsystem of the real system. In another embodiment of this form, different persons specify the parameters and data of the various simulation programs that can be viewed and/or controlled by or through other computers in the system 20.

In another form of the present invention, a computer-readable medium is encoded with programming instructions executable by a first processor to (a) implement a first simulation model having a first state variable, (b) accept a first command signal from a program being executed by another processor, and (c) manage the first simulation model based on the first command signal; likewise, second computer-readable medium is encoded with programming instructions executable by a second processor in communication with an output device to (1) send the first command signal to the first processor, (2) cause the output device to make a first output reflecting information relating to the first state variable over a period of simulation time. In one embodiment of this form of the invention, information relating to the value of one or more state variables in the first simulation are passed to (or received from) the second simulation at regular intervals of real time. In another embodiment of this form, information relating to the values of one or more state variables in the first simulation are passed to (or received from) the second simulation at regular intervals of simulation time. In yet another embodiment of this form, information relating to the values of one or more state variables in the first simulation are passed to (or received from) the second simulation at intervals of simulation time that vary according to the state(s) of one or more models in the system. In still another embodiment of this form, information relating to the values of two or more state variables in the first simulation are passed to (or received from) the second simulation. In a further embodiment, information relating to the values of four or more state variables in the first simulation are passed to (or received from) the second simulation. In a still further embodiment of this form, information relating to the values of n≧2 state variables in the first simulation are passed to (or received from) the second simulation, and at least one message in a series of state-related messages sent by the first simulation contains information relating to the value of each of the n≧2 state variables. In a yet further embodiment, information relating to the values of n≧2 state variables in the first simulation are passed to (or received from) the second simulation, and at least one message in a series of state-related messages sent by the first simulation contains information relating to the value of exactly one of the n state variables. In other embodiments of this form, one process makes the request, but the first simulation directs the series of state-related messages to a different process. In yet another embodiment, a process receives the series of state-related messages and displays (e.g., a graph of a function of a state variable versus [simulation] time) on an output device (e.g., a monitor or printer) information carried by a plurality of the messages in that series.

Yet another form of the present invention comprises a plurality of simulations operating on a plurality of computers. A system monitor communicates with each simulation, and is capable of configuring, controlling, and/or coordinating each simulation. In one embodiment of this form, a local control panel applet is also provided for each simulation and is capable of configuring, controlling, and/or coordinating that particular simulation.

In some embodiments, different subsystem model implementations 22, 24, 26, 28 use different techniques and/or parameters for integration. For example, one model might use the finite Euler integration technique with new values being estimated every millisecond, while another uses Runge-Kutta integration with a one microsecond estimation interval. This type of embodiment enables more efficient simulation of systems that include fast-changing and slow-changing signals by "sampling" each subsystem at an appropriate rate without wasting computing resources on frequent sampling of slow-changing signals.

In some embodiments, plug-in components are provided for simulation development, wherein a "black box" element is placed in a subsystem model implementation design to represent one or more other subsystems in the simulation. Parameters are programmed for the "black box" that define the inputs and outputs of the subsystem that will be provided by and to (respectively) the neighboring subsystem. In some of these embodiments, the "black box" is represented by a block in a GUI simulation design tool. Fields associated with the "black box" in the subsystem model implementation indicate the networking (e.g., IP address and TCP port number) and signaling (e.g., messaging frequency and availability of variables) parameters for that connection.

It will be understood by those skilled in the art that computers 23, 25, 27, 29, and other computers discussed in this description may comprise additional or alternative components as needed or desired in a particular implementation. Likewise, additional or alternative devices may be connected to network 21 and or subnetwork 261 (see FIGS. 1 and 6) without departing from the spirit of this invention.

All publications, prior applications, and other documents cited herein are hereby incorporated by reference in their entirety as if each had been individually incorporated by reference and fully set forth.

While the invention has been illustrated and described in detail in the drawings and foregoing description, the same is to be considered as illustrative and not restrictive in character, it being understood that only the preferred embodiments have been shown and described and that all changes and modifications that would occur to one skilled in the relevant art are desired to be protected.

What is claimed is:

1. A computer-implemented method for simulating operation of a physical system having a plurality of physical subsystems, comprising:
   simulating a first physical subsystem with a first continuous-time simulation on a first physical computing device;
   accepting a request for export of information relating to a number n of state-related variables that characterize the state of the first physical subsystem in said simulating;
   sending a first series of state-related messages, each message containing information relating to the value of at least one of the n state-related variables;
   simulating a second physical subsystem with a second continuous-time simulation on a second physical computing device;
   receiving in said second continuous-time simulation said first series of state-related messages from said first continuous-time simulation without said first series of state-related messages passing through a central communication process; and
   outputting data representative of a state of the second continuous-time simulation; wherein:
   the first physical subsystem interacts with the second physical subsystem; and
   the at least one state-related variable characterizes at least a portion of the interaction between the first physical subsystem and the second physical subsystem.

2. The method of claim 1, wherein the number n is at least two.

3. The method of claim 2, wherein the number n is at least four.

4. The method of claim 2, further comprising sending a third series of state-related numerical values, wherein:
   at least one numerical value in the first series of state-related numerical values contains information relating to the values of a first proper subset of the set containing all n state-related variables;
   at least one numerical value in the third series of state-related numerical values contains information relating to the values of a second proper subset of the set containing all n state variables, and
   the second proper subset is different from the first proper subset.

5. The method of claim 1, wherein:
   a given process makes the request; and
   said sending directs the first series of state-related numerical values to a process different from the given process.

6. The method of claim 1, further comprising:
   receiving the first series of state-related numerical values in a first output process in communication with a first output device; and
   sending to the first output device a first set of information carried by a plurality of numerical values in the first series of state-related numerical values; and
   wherein the first output device is in communication with the first output process.

7. The method of claim 6, wherein said displaying comprises graphing a function of the first state-related variable versus an independent variable.

8. The method of claim 6, further comprising:
receiving a second series of state-related numerical values in the first output process; and
sending to the first output device a second set of information represented by a plurality of numerical values in the second series of state-related numerical values; and
wherein said sending steps comprise outputting time information associating the first set of information and the second set of information with a system time.

9. The method of claim 6, further comprising:
receiving a second series of state-related numerical values in a second output process, which is in communication with a second output device; and
outputting to the second output device a second set of information carried by a plurality of numerical values in the second series of state-related numerical values;
wherein said sending comprises associating the first set of information with a system time; and
said outputting comprises associating the second set of information with an independent variable.

10. The method of claim 4, wherein:
the second series of state-related numerical values is sent to a first destination; and
the third series of state-related numerical values is sent to the first destination.

11. The method of claim 4, wherein:
the second series of state-related numerical values is sent to a first destination; and
the third series of state-related numerical values is sent to a second destination.

* * * * *